United States Patent
Glaspy, Jr. et al.

(10) Patent No.: US 7,391,529 B2
(45) Date of Patent: *Jun. 24, 2008

(54) APPARATUS AND METHOD FOR MANAGING AND USING REUSABLE DOCUMENT COMPONENTS DURING THE PROCESS OF DYNAMIC DOCUMENT CONSTRUCTION

(75) Inventors: Jay A. Glaspy, Jr., Rochester, NY (US); Eric S. Barnes, Manhattan Beach, CA (US); Ammar T. Degani, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1041 days.

This patent is subject to a terminal disclaimer.

(21) Appl. No.: 10/342,610

(22) Filed: Jan. 15, 2003

(65) Prior Publication Data

US 2004/0136033 A1 Jul. 15, 2004

(51) Int. Cl.
*G06F 15/00* (2006.01)
*G06K 1/00* (2006.01)

(52) U.S. Cl. .............. 358/1.18; 358/1.1; 358/1.15; 715/531; 380/54

(58) Field of Classification Search ............. 358/1.15, 358/1.16, 1.18, 1.1; 715/531, 530, 51, 525; 726/4, 18; 380/54
See application file for complete search history.

(56) References Cited

U.S. PATENT DOCUMENTS

| | | | |
|---|---|---|---|
| 5,655,130 A * | 8/1997 | Dodge et al. | 715/511 |
| 5,895,477 A | 4/1999 | Orr et al. | |
| 6,014,224 A * | 1/2000 | Mitani | 358/1.16 |
| 6,065,026 A | 5/2000 | Cornelia et al. | |
| 6,134,018 A | 10/2000 | Dziesietnik et al. | |
| 6,256,108 B1 | 7/2001 | Dziesietnik et al. | |
| 6,272,252 B1 | 8/2001 | Eldridge et al. | |
| 6,307,977 B1 | 10/2001 | Eldridge et al. | |
| 6,317,222 B1 | 11/2001 | Eldridge et al. | |
| 6,441,919 B1 * | 8/2002 | Parker et al. | 358/1.18 |
| 6,597,467 B2 * | 7/2003 | Miyake et al. | 358/1.15 |
| 6,611,598 B1 * | 8/2003 | Hayosh | 380/54 |
| 6,775,781 B1 * | 8/2004 | Phillips et al. | 726/4 |
| 6,922,784 B2 * | 7/2005 | Phillips et al. | 726/18 |
| 7,233,407 B1 * | 6/2007 | Simchik et al. | 358/1.15 |
| 2003/0086098 A1 * | 5/2003 | Sesek et al. | 358/1.1 |
| 2004/0216048 A1 * | 10/2004 | Brown et al. | 715/530 |
| 2005/0044494 A1 * | 2/2005 | Barnes et al. | 715/531 |
| 2005/0283722 A1 * | 12/2005 | Warmus et al. | 715/525 |

* cited by examiner

*Primary Examiner*—Thomas D. Lee
*Assistant Examiner*—Satwant K Singh
(74) *Attorney, Agent, or Firm*—Fay Sharpe LLP

(57) ABSTRACT

An apparatus (10) for processing documents each represented by a document description (12) encoded in a page description language supportive of reusable data includes a page description language interpreter (14) that receives the document description (12) and parses the document description (12) into document components. An imager (16), communicating with the interpreter (14), creates image representations of received document components. A reusable document component repository (32) stores image representations derived from a plurality of processed documents. The reusable document component repository (32) communicates with the interpreter (14) and the imager (16) to supply those ones of the image representations corresponding to selected document components of the processed documents and to receive selected image representations created by the imager (16) during the processing of documents.

25 Claims, 3 Drawing Sheets

APPARATUS AND METHOD FOR MANAGING AND USING REUSABLE DOCUMENT COMPONENTS DURING THE PROCESS OF DYNAMIC DOCUMENT CONSTRUCTION

BACKGROUND OF THE INVENTION

The present invention relates to the information processing arts. It finds particular application in conjunction with printing and electrophotography, and will be described with particular reference thereto. However, it is to be appreciated that the present invention will also find application in other information processing applications which merge variable data into static data.

Print jobs commonly include a mixture of variable and static content. Static content is substantially non-repeating, whereas variable content repeats on a given page, across a plurality of pages, and/or across print jobs. A typical example is a print job including one or more completed electronic forms. The form is static because it is printed each time a completed form is printed. However, the information entered into the electronic form is variable content which will typically differ for each person's completed form. Another example of a print job containing a mixture of variable and static content is a business letter with a standardized letterhead that is printed as part of the letter. The letterhead is static content across business letters, whereas the text of each letter is variable content. Similarly, in high print volume personalized advertising for mailing to customers or other large groups, the basic content is static while certain portions of the advertising are personalized based on information extracted from a customer database.

A print job is typically encoded using a high-level page description language (PDL). The PDL describes the print job in terms of text, fonts and font sizes, image positions and dimensions, vectorized line drawings, background colors and shades, page borders, and the like. The print job PDL is converted into a rasterized image representation by a rasterized image processor (RIP). The rasterized image representation outputs a contone image in the case of color printing, or a bitmap or gray scale image for black-and-white printing. Optionally, the rasterized image representation is compressed. The contone or bitmapped image is forwarded to downstream elements such as a decompression module, and ultimately to a print engine which effectuates printer-specific formatting and the actual printing.

The most recent version of the Xerox variable data intelligent postscript printware PDL (VIPP-2001) supports a reusable document component hint that indicates the associated document component is likely to be reused in the print job. However, there is a need for a mechanism for taking advantage of reusable document component hints to streamline the rasterizing process, especially with respect to document components which are reused across print jobs.

The present invention contemplates a new and improved method and apparatus which overcomes the above-referenced problems and others.

SUMMARY OF THE INVENTION

In accordance with one aspect of the present invention, a document construction method is provided. A document description is received. The document description includes at least one selected reusable document component. A reusable document component repository containing stored image representations of reusable document components is queried to locate a selected stored image representation corresponding to the selected reusable document component. Conditional upon the querying, either: (i) identifying one of the stored image representations as corresponding to the selected reusable document component and retrieving the selected stored image representation corresponding to the selected reusable document component; or, (ii) not identifying one of the stored image representations as corresponding to the selected reusable document component, generating an image representation for the selected reusable document component, and storing the generated image representation in the reusable document component repository. The document description is converted to a document image representation. The converting includes incorporating the selected or generated image representation corresponding to the selected reusable document into the document image representation.

In accordance with another aspect of the present invention, an apparatus is disclosed for processing documents each represented by a document description encoded in a page description language supportive of reusable data. A page description language interpreter receives the document description and parses the document description into document components. An imager, communicating with the interpreter, creates image representations of received document components. A reusable document component repository stores image representations derived from a plurality of processed documents. The reusable document component repository communicates with the interpreter and the imager to supply those ones of the image representations corresponding to selected document components of the processed documents and to receive selected image representations created by the imager during the processing of documents.

In accordance with yet another aspect of the present invention, an electrophotographic method is provided. A page description language (PDL) representation of a print job is received. The PDL representation is converted into a print job pixel map. During the converting and responsive to identifying a reusable document component (RDC) hint, an RDC repository is searched for a corresponding RDC pixel map. Either: (i) a found corresponding pixel map is integrated into the print job pixel map; or (ii) the RDC is rasterized to generate a pixel map, the generated pixel map is integrated into the print job pixel map, and the generated pixel map is stored in the RDC repository. The print job pixel map is electrophotographically printed.

Numerous advantages and benefits of the present invention will become apparent to those of ordinary skill in the art upon reading and understanding the following detailed description of the preferred embodiments.

DETAILED DESCRIPTION OF THE PREFERRED EMBODIMENTS

Figure 1:
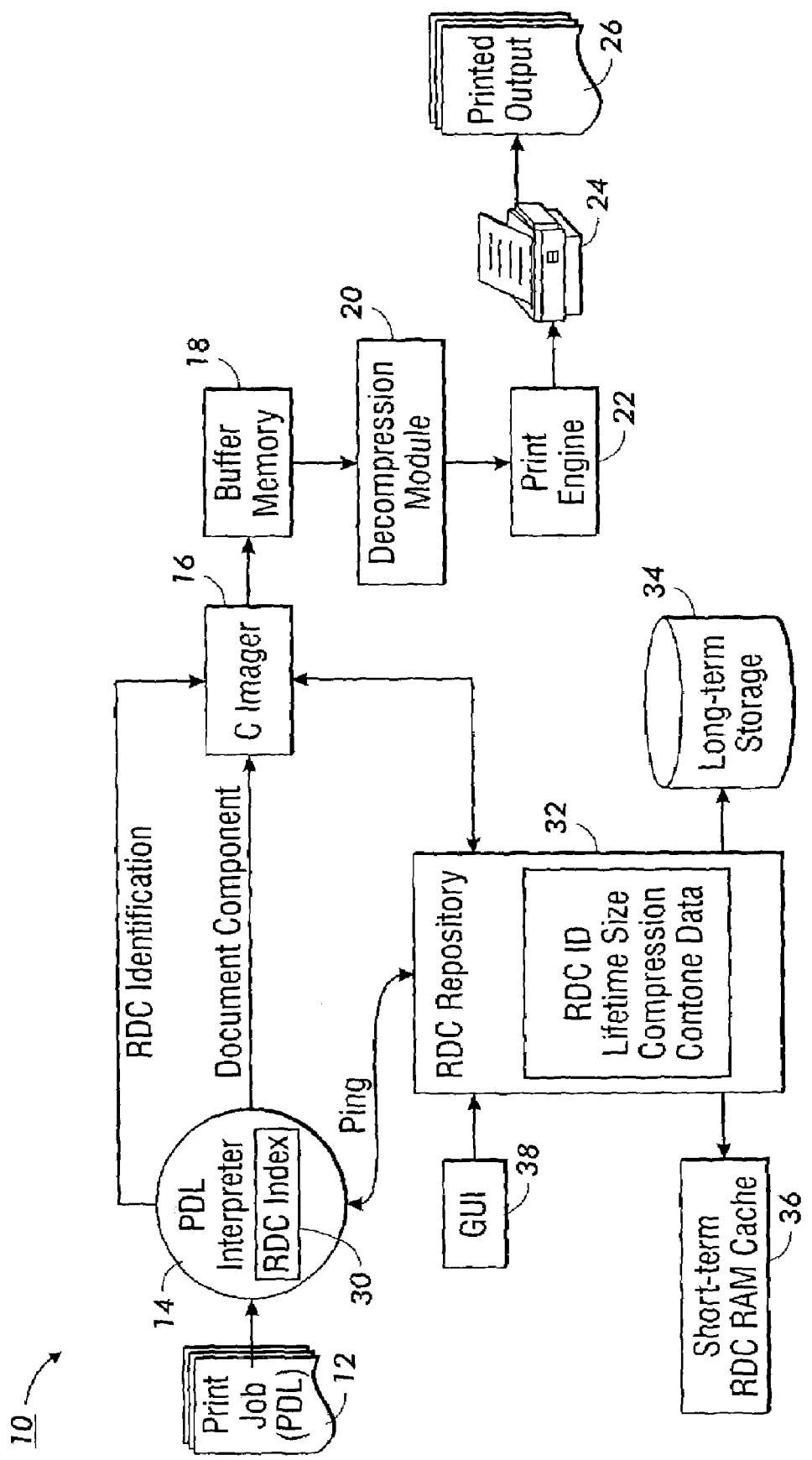
FIG. 1 diagrammatically illustrates an apparatus embodiment of the invention for performing document construction.

With reference to FIG. 1, an exemplary apparatus 10 for performing document construction receives a document description 12 describing a print job, an electronic document, or the like. The document description 12 is preferably encoded in a page description language (PDL) representation such as a Variable data Intelligent Postscript Printware language (VIPP, available from Xerox Corporation) or a Personalized Print Markup Language (PPML) based upon the Extensible Markup Language (XML) standard. The PDL specification includes at least one reuse hint that indicates a selected document component is a reusable document component (RDC).

Because the apparatus 10 supports reuse of document components across document jobs, the reuse hint optionally indicates a document component which appears only once within the document description 12, but which is likely to be present in other documents. The hint can also pertain to document components which are reused within the document description 12, or to document components that are both reused within the document description 12 and across print jobs.

The document description 12 is processed by a PDL interpreter 14 that processes document portions or components. Typically, a document component is forwarded to a compressor/imager (CImager) 16 that rasterizes the image into one or more pixel maps and compresses the pixel maps to reduce memory usage during storage prior to printing. For color document components, the pixel maps are preferably continuous tone (contone) pixel maps, while for black-and-white document components bit maps or half-tone pixel maps are suitable. The CImager 16 constructs rasterized document pages from the document components. A buffer memory 18 accumulates rasterized document pages as they are constructed. The rasterized document pages are subsequently processed by a decompression module 20 that expands the compressed pixel maps. The resulting uncompressed rasterized document pages are forwarded to a print engine 22 that processes the pixel maps and controls a printing device 24, such as an electrophotographic printer, to produce a printed document 26.

Instead of producing a printed document, the compressed pixel maps or document pages can alternatively or additionally be processed and used in other ways, such as being stored on a magnetic or optical disk for electronic viewing over a local network or over the Internet, transmitted via electronic mail, imported into another document or application, or the like.

The apparatus 10 operates as described above for most document components. However, the VIPP-2001 (available from Xerox Corporation) or other page description language in which the document description 12 is encoded supports reusable document hints that enable reuse of document components which are rendered multiple times within a single document. An application such as a word processor, publication software, or the like (not shown) which generated the document description 12 optionally included reuse hints. By employing the apparatus 10, these hints can be applied by the generating application to promote reuse of document components both within a selected document and also across documents, as described below.

When the PDL interpreter 14 encounters a reusable document hint in the document description 12, the PDL interpreter 14 references an internal state, such as a reusable document component (RDC) index 30, to determine whether or not the document component corresponding to the reuse hint has previously been rasterized and stored in a compressed rasterized format in an RDC repository 32. The RDC repository 32 includes RDCs accumulated during past processing of other documents as well as RDCs generated as the present print job 12 is processed. Typically, the RDC repository 32 includes RDCs obtained from a number of previously processed documents.

If the PDL interpreter 12 locates an RDC identification in the RDC index 30 that corresponds to the document component with the hint, the PDL interpreter 12 pings or otherwise communicates with the RDC repository 32 to: (1) verify that the RDC is still contained in the RDC repository 32; and (2) command the RDC repository to preserve the RDC until it is accessed. The PDL interpreter 12 also sends the RDC identification to the CImager 16, rather than sending the actual document component. The CImager 16 receives the RDC identification, and communicates with the RDC repository 32 to retrieve the corresponding compressed pixel map, which is then stored in the buffer memory 18 and further processed substantially similarly to the processing of ordinary (i.e., not reusable) document components.

If, however, the PDL interpreter 12 does not locate the document component in the RDC index 30, it communicates both the document component and an RDC identification to the CImager 16. The CImager processes the document component to generate a compressed pixel map which is stored in the buffer memory 18 and further processed as usual. The CImager additionally sends the compressed pixel map along with the RDC identification to the RDC repository 32 for storage for possible reuse.

The RDC is stored in the RDC repository 32 as a compressed pixel map (e.g., compressed contone data for typical color document components). Along with the compressed pixel map, the RDC repository 32 preferably stores selected additional information pertaining to the RDC, such as a compression mode, an RDC size, the RDC identification, and a lifetime parameter. It is contemplated to use no compression (e.g., compression mode=uncompressed) for some or all RDCs to maximize processing speed. However, in most situations a trade-off between rasterizing speed and memory usage will make some compression preferable.

The lifetime parameter indicates how long the RDC repository 32 should store the RDC. The lifetime is suitably determined by the PDL interpreter 14 and communicated along with the RDC identification to the CImager 16, which then forwards the lifetime to the RDC repository 32. The lifetime can correspond to a lifetime indicated along with the reuse hint in the document description 12. Alternatively, the lifetime is selected by the PDL interpreter 14 based on the type of RDC, the nature of the document description 12, parameters of the corresponding print job, or similar information. In one suitable selection, the lifetime is set to the termination of the present print job described by the document description 12. In another suitable selection, the lifetime is set to "permanent" or the like, indicating that the RDC should not be deleted except by an express command of a user.

The RDCs of the RDC repository 32 are stored in a long-term non-volatile storage 34 and/or a short-term RDC random access memory (RAM) cache 36 associated with the repository 32. Preferably, a user can manage the RDC repository 32 including the storage areas 34, 36 via a graphical user interface (GUI) 38. Optionally, the RDC repository 32 also performs an automated least-recently used RAM cache cleanup process when the RAM cache 36 is close to full capacity to remove from the RAM cache 36 those RDCs that have not been accessed recently. The automated cleanup advantageously frees up space in the RAM cache 36 for RDCs which are currently being frequently accessed, while relegating less-frequently accessed RDCs to the non-volatile long-term storage 34. Optionally, the RDC repository 32 references the lifetime parameter associated with a RDC to perform automated deletions of RDCs from the RAM cache 36, and optionally also from the long-term storage 34. Optionally, other storage retention schedules may also be selected by a user.

Figure 2:
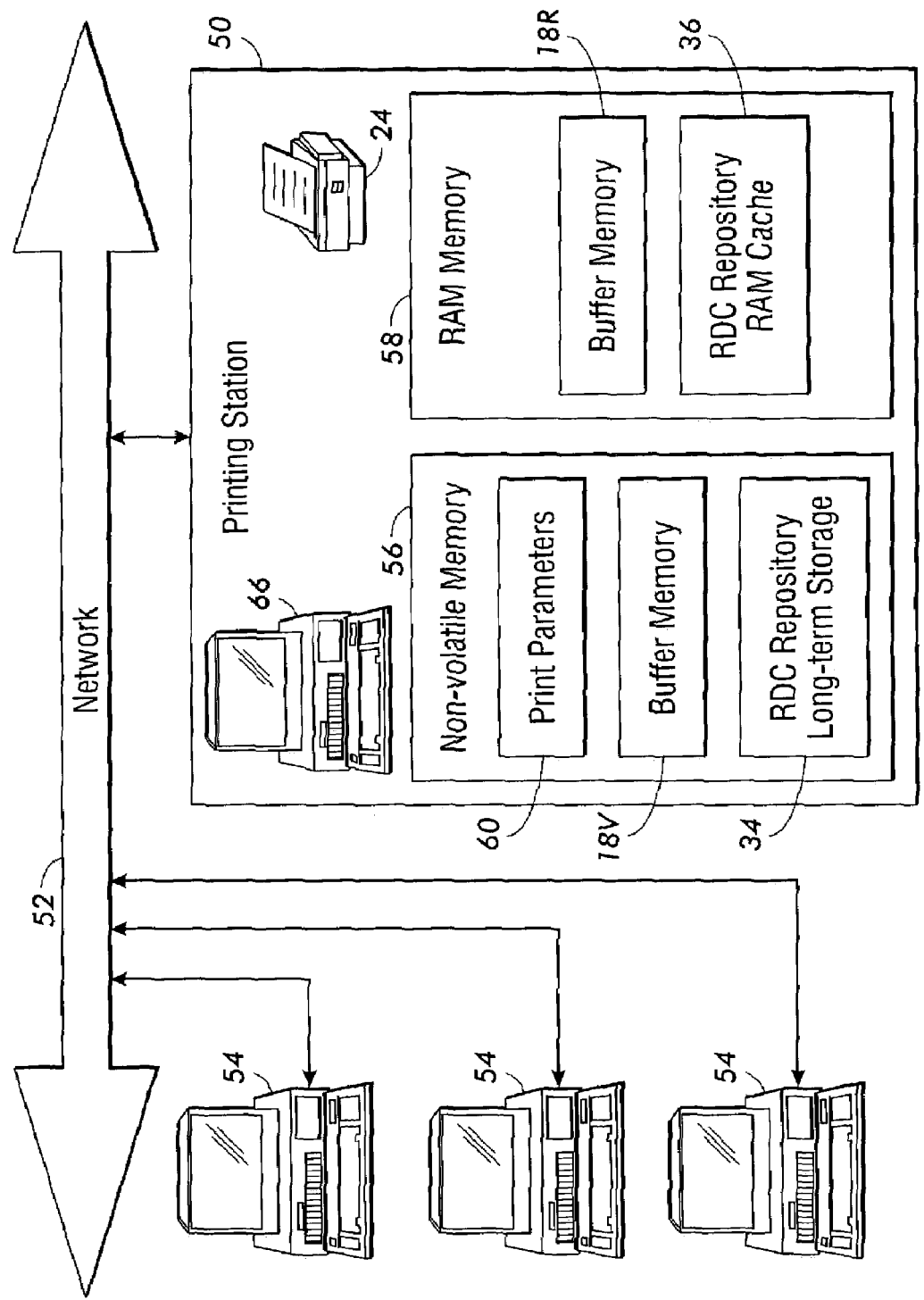
FIG. 2 diagrammatically illustrates an exemplary integration of the apparatus of FIG. 1 into a network-based printing station.

With continuing reference to FIG. 1 and with further reference to FIG. 2, the apparatus 10 is suitably integrated into a printing station 50, such as an electrophotographic color or black-and-white printing press, which is connected with a computer network 52 that also includes one or more computers 54, such as personal computers (PCs), workstations, or the like. The printing station 50 receives print jobs such as the exemplary document description 12 via the network 52.

The non-volatile and RAM memories 34, 36 are suitably embodied as allocated portions of general-purpose non-volatile memory 56 and RAM memory 58, respectively, of the printing station 50. These memories 56, 58 also store information such as printing parameters 60 for the printing station 50, and the buffer memory 18 (identified in FIG. 2 as non-volatile and RAM buffer memories 18V, 18R). The allocated memory portions 34, 36 are allocated to the RDC repository 32 for use in storing the RDCs. The allocation of these memories 34, 36 is optionally user adjustable using the GUI 38, which is suitably embodied as a dedicated PC 66 associated with the printing station 50. The GUI 38 can additionally or alternatively be embodied by one or more of the computers 54 connected with the network 52. For example, a workstation or PC of a network system administrator suitably embodies the GUI 38.

Preferably, other elements of the apparatus 10 shown in FIG. 1, such as the PDL interpreter 14, the CImager 16, decompression module 20, and print engine 22, are also integrated into the printing station 50; however, these are not shown in FIG. 2 for the convenience of the reader.

With continuing reference to FIGS. 1 and 2, the GUI 38 enables a user such as a network system administrator to perform various administrative tasks relating to the RDC repository 32, including selecting appropriate allocations for the non-volatile and RAM memory portions 34, 36, and selectively deleting RDCs from the long-term storage 34. Preferably, if a memory 34, 36 is re-allocated by a user to a smaller capacity which is insufficient to retain the RDCs currently stored therein, the user will be notified of this condition by the GUI 38 and prompted to either abort the re-allocation or perform a manual deletion of RDCs via the GUI 38 to make the memory contents comport with the reduced re-allocated memory capacity.

In a preferred embodiment, management of RDCs stored in the RDC repository 32 which are marked with "permanent" lifetimes are not automatically deleted. Rather, the system administrator or other user performs manual deletions of permanent RDCs. On the other hand, RDCs with finite lifetimes are preferably automatically removed by the RDC repository 32 responsive to an expiration of the finite lifetime. However, the administrator or other user has the option of deleting RDCs with finite lifetimes before the lifetime expires. If, however, the PDL interpreter 14 has pinged the RDC repository 32 to indicate that the RDC is to be retrieved by the CImager 16, then the pinged RDC is suitably made undeletable by both the user and the automated management of the RDC repository 32 until the retrieval by the CImager 16 occurs. Preferably, the PDL interpreter 14 also has the capability of reversing the pinging, i.e. returning the pinged PDL to a normal (deletable) status, for example if an error at the CImager 16 prevents it from retrieving the pinged RDC.

Using allocations of the existing memories 56, 58 of the printing station 50 advantageously allows the document reuse apparatus 10 to be retro-fitted into an existing printing installation through a software upgrade. However, it is also contemplated to include additional non-volatile memory and/or RAM memory components that are dedicated to storing the RDCs under the direction of the RDC repository 32. Retrofitting such an embodiment would typically include both a software upgrade and installation of the dedicated memory components.

Figure 3:
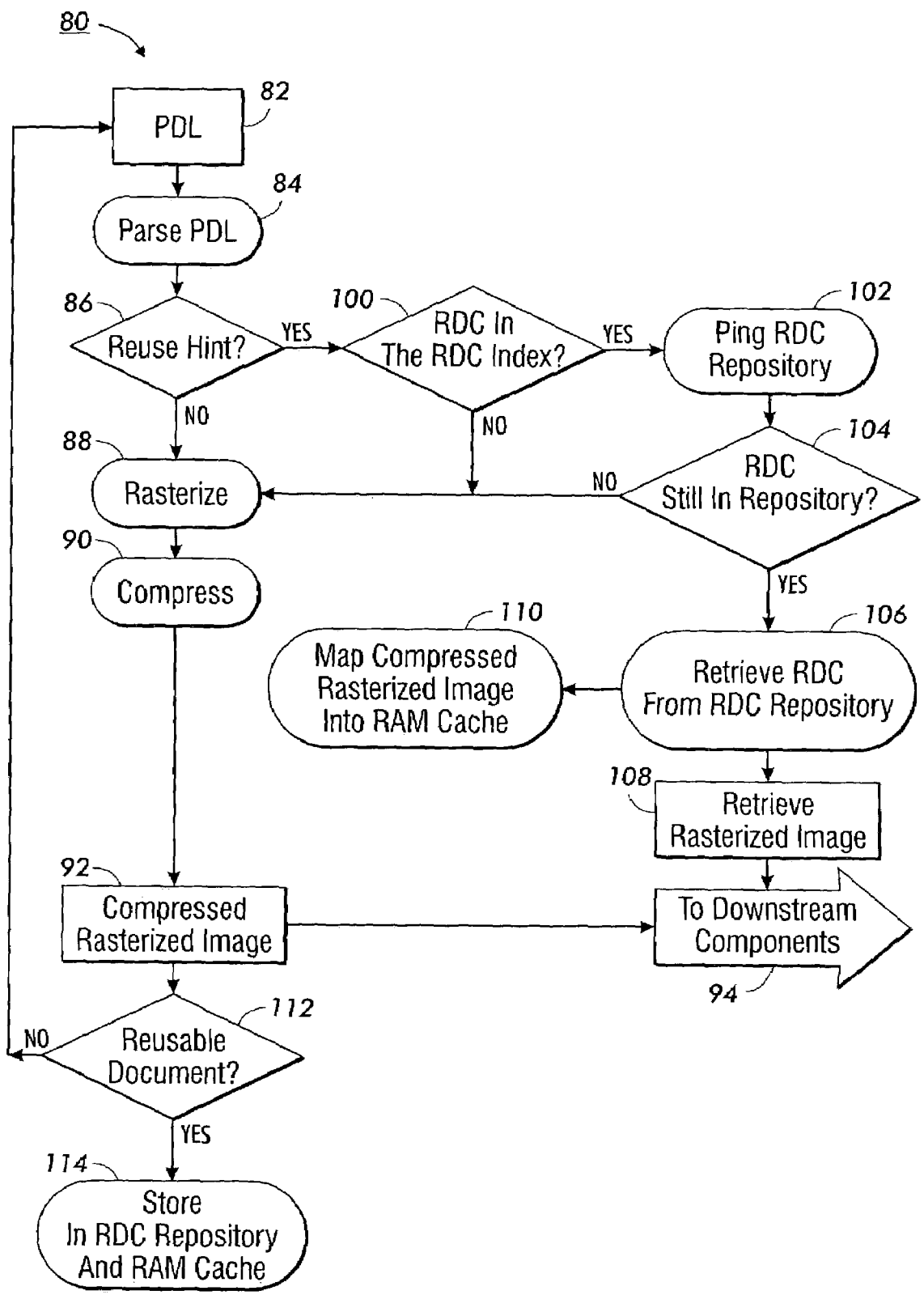
FIG. 3 illustrates a flow chart of a method embodiment of the invention that performs document construction.

With reference to FIG. 3, a method 80 for employing the RDC repository 32 during document construction is described. A PDL document 82 is examined in a parsing step 84 to identify document components for rasterization. Each document component is checked in a decision step 86 to determine whether the document component has a reuse hint associated therewith. If there is no reuse hint, then the document component is rasterized in a step 88 and optionally compressed in a step 90 to produce a compressed rasterized document component 92 which is sent to downstream components 94 such as the buffer memory 18, the decompression module 20, and the print engine 22 (shown in FIG. 1).

If, however, the decision step 86 finds that a reuse hint is associated with the document component, i.e. finds that the document component is a reusable document component (RDC), the PDL interpreter 14 checks the RDC index 30 in a decision step 100 to determine whether the RDC has been previously encountered and a corresponding pixel map stored in the RDC repository 32.

If the decision step 100 indicates that the RDC has been encountered previously, the PDL interpreter 14 pings the RDC repository 32 in a step 102 to verify that the pixel map corresponding to the RDC is still in the RDC repository 32. At a decision step 104 the PDL interpreter 14 decides how to proceed based upon a response of the RDC repository 32 to the pinging 102. If the RDC repository locates a corresponding pixel map, it marks it as read-only and communicates a confirmation to the PDL interpreter 14 that the pixel map is available. In this case, a retrieval step 106 is performed to retrieve the corresponding compressed pixel map 108 from the RDC repository 32. If the retrieval was from the long-term storage 34, the RDC (which is now the most recently used RDC) is preferably mapped into the RAM cache in a step 110. Preferably, the retrieval step 106 also resets the status of the RDC in the RDC repository 32 to a normal (deletable) status. The retrieved compressed pixel map 108 is sent to the downstream components 94 in substantially the same manner as if the CImager 16 had just generated it.

If, however, the decision step 100 finds that the RDC is not indexed in the RDC index 30, or if the decision step 104 finds that the pixel map corresponding to the RDC is no longer in the RDC repository 32, (e.g., it has been deleted automatically or by a user through the GUI 38), then the rasterizing and optional compressing steps 88, 90 are performed as in the case of an ordinary (non-reusable) document component. The resulting compressed pixel map 92 is communicated to the downstream components 94. Additionally, however, at a decision step 112 it is recognized that the newly created pixel map 92 corresponds to a reusable document component, and so in a step 114 the created pixel map 92 is additionally communicated to the RDC repository 32 to be stored in the long-term storage 34 for possible later reuse. Since this newly created RDC is also the most recently used RDC, it is preferably mapped into the RAM cache 36. If the RDC has a short lifetime, e.g. limited to the present print job, the RDC is optionally placed in the RDC ram cache 36 only, and is not additionally stored in the long-term storage 34.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A document printing method comprising:
  receiving a document for printing encoded in a page description language and including at least one selected reusable document component;
  rasterizing the document to generate rasterized document pages corresponding to the document, the rasterizing including querying a reusable document component repository containing stored previously rasterized image representations of reusable document components to locate a selected stored previously rasterized image representation corresponding to the selected reusable document component and, conditional upon the querying,
    (i) identifying one of the stored previously rasterized image representations as corresponding to the selected reusable document component and retrieving the identified stored previously rasterized image representation corresponding to the selected reusable document component, or,
    (ii) not identifying one of the stored previously rasterized image representations as corresponding to the selected reusable document component, generating a rasterized image representation of the selected reusable document component and storing the generated rasterized image representation in the reusable document component repository, the storing of the generated rasterized image representation in the reusable document component repository including, prior to the storing, compressing the image; and
  printing the rasterized document pages to produce a printed document corresponding to the received document.

2. The printing method as set forth in claim 1, wherein the step of storing the generated rasterized image representation in the reusable document component repository includes:
  associating a life span parameter with the generated rasterized image representation; and
  responsive to an expiration of the life span parameter, removing the corresponding generated rasterized image representation from the reusable document component repository.

3. The document printing method as set forth in claim 2, wherein the step of associating a life span parameter with the generated rasterized image representation includes:
  associating one of a temporal life span and an indication of permanence with the generated rasterized image representation.

4. The printing method as set forth in claim 2, wherein the life span parameter is such that the generated rasterized image representation remains available in the reusable document component repository for reuse in the construction of subsequent documents.

5. The document printing method as set forth in claim 1, further including:
  responsive to a selected user input, removing the generated rasterized image representation from the reusable document component repository.

6. The document printing method as set forth in claim 1, wherein the querying includes:
  tracking previously generated rasterized image representations; and
  conditional upon the tracking indicating that a previously generated rasterized image representation corresponds to the selected reusable document component, verifying the previously generated rasterized image representation currently resides in the reusable document component repository.

7. The document printing method as set forth in claim 6, wherein the querying further includes:
  conditional upon a successful verifying, marking the previously generated rasterized image representation to prevent a removing thereof.

8. The document printing method as set forth in claim 1, further including:
  storing at least a portion of the reusable document component repository in a random access memory (RAM) cache.

9. The document printing method as set forth in claim 1, further including:
  storing the reusable document component repository on a permanent storage device; and
  storing most recently accessed image representations in a random access memory (RAM) cache.

10. The document printing method as set forth in claim 1, further including:
  identifying the selected reusable document component as reusable by detecting a reusable document component hint associated with the reusable document component.

11. The document printing method as set forth in claim 10, wherein the document is encoded in a Variable data Intelligent Postscript Printware language (VIPP).

12. The document printing method as set forth in claim 10, wherein the document is encoded in a Personalized Print Markup Language (PPM L).

13. An apparatus for preparing documents for printing, each document represented by a document description encoded in a page description description language supportive of reusable data, the apparatus comprising:
  a page description language interpreter that receives the document description and parses the document description into document components;
  an imager, communicating with the interpreter, that creates image representations of received document components;
  a reusable document component repository that stores image representations previously generated by the imager for previously received document components, the reusable document component repository communicating with the interpreter and the imager to supply those ones of the image representations corresponding to selected document components of the processed documents and to receive and store selected image representations created by the imager during the processing of documents; and
  a graphical user interface (GUI) through which an associated user manages the reusable document component repository, the managing including selectively adjusting a repository storage size and selectively deleting image representations.

14. The apparatus as set forth in claim 13, further including:
  a compressor that receives and compresses image representations created by the imager, and communicates the compressed image representations to the reusable document component repository.

15. The apparatus as set forth in claim 14, wherein the compressor is integrated into the imager.

16. The apparatus as set forth in claim 13, further including:
  a random access memory cache communicating with the interpreter and the reusable document component repository, the random access memory storing at least one most recently used image representation retrieved by the interpreter.

17. The apparatus as set forth in claim 13, further including:
a repository index that indexes image representations stored in the reusable document component repository, the repository index communicating with the interpreter to identify images to be retrieved.

18. The apparatus as set forth in claim 17, further including:
a ping path between the interpreter and the reusable document component repository by which the interpreter pings the reusable document component repository responsive to the repository index indicating that a selected image representation is contained in the reusable document component repository, the pinging directing the reusable document component repository not to delete of the selected image representation.

19. The apparatus as set forth in claim 17, wherein the repository index is integrated into the page description language interpreter.

20. The apparatus as set forth in claim 13, further including:
a printing station that includes the page description language interpreter, the imager, and the reusable document component repository; and
an electronic network by which the printing station receives documents for processing.

21. An electrophotographic method comprising:
receiving a page description language (PDL) representation of a print job;
converting the PDL representation into a print job pixel map;
during the converting and responsive to identifying a reusable document component (RDC) hint, searching an RDC repository for a corresponding RDC pixel map and either (i) integrating a found corresponding pixel map into the print job pixel map, or (ii) rasterizing the RDC to generate a pixel map, integrating the generated pixel map into the print job pixel map, and storing the generated pixel map in the RDC repository;
electrophotographically printing the print job pixel map.

22. The electrophotographic method as set forth in claim 21, further including:
maintaining a repository index identifying contents of the RDC repository, wherein the step of searching of the RDC repository for a pixel map includes searching the repository index.

23. The electrophotographic method as set forth in claim 21, wherein the integrating of a found corresponding pixel map into the print job pixel map includes:
marking the found corresponding pixel map in the RDC repository to prevent its deletion prior to the integrating of the found corresponding pixel map into the print job pixel map.

24. The electrophotographic method as set forth in claim 21, wherein the converting of the PDL representation into a print job pixel map includes:
compressing the print job pixel map during the converting; and
prior to the electrophotographic printing, decompressing the compressed print job pixel map.

25. The electrophotographic method as set forth in claim 21, wherein the page description language is one of VIPP and PPML.

* * * * *